(12) United States Patent
Rosen et al.

(10) Patent No.: US 6,347,719 B1
(45) Date of Patent: Feb. 19, 2002

(54) LIGHT WEIGHT HYDROGEN TANK

(75) Inventors: Harold Rosen, Santa Monica; Alois Wittmann, Rancho Palos Verdes; Scott Pano, Torrance, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/615,671

(22) Filed: Jul. 14, 2000

(51) Int. Cl.$^7$ ............................................... B65D 25/00
(52) U.S. Cl. ..................... 220/4.14; 220/560.1; 220/586
(58) Field of Search ............................... 220/4.14, 4.15, 220/560.07, 560.09, 560.1, 560.13, 592.21, 661, 586

(56) References Cited

U.S. PATENT DOCUMENTS

| | | | | |
|---|---|---|---|---|
| 2,776,776 A | * | 1/1957 | Strong et al. ....... | 220/560.09 X |
| 3,147,877 A | * | 9/1964 | Beckman ........... | 220/560.09 X |
| 3,231,125 A | * | 1/1966 | Sigona ................ | 220/560.13 |
| 3,525,452 A | * | 8/1970 | Hofmann ........... | 220/560.13 X |
| 3,612,334 A | * | 10/1971 | Gardner ............. | 220/560.1 |
| 4,140,073 A | * | 2/1979 | Androulakis ....... | 220/560.13 X |
| 4,156,492 A | * | 5/1979 | Cavanna et al. ..... | 220/560.1 |
| 4,343,413 A | * | 8/1982 | Chatzipetros et al. .. | 220/560.09 |
| 4,856,174 A | * | 8/1989 | Ishizaki et al. ..... | 220/592.21 X |
| 5,810,284 A | | 9/1998 | Hibbs et al. ......... | 244/13 |
| 6,145,692 A | * | 11/2000 | Cherevatsky ....... | 220/586 |

* cited by examiner

*Primary Examiner*—Steven Pollard
(74) *Attorney, Agent, or Firm*—V. D. Duraiswamy; M. W. Sales

(57) ABSTRACT

A light weight fuel tank for a hydrogen powered airplane used as a platform for communication repeaters for communication services. An outer spherical shell member of a sandwich configuration surrounds an inner thin walled spherical shell member in which the liquid hydrogen is contained. A radial gap between the shell members is evacuated to a high vacuum. The facing surfaces of the shell members are coated with a low emissivity material. Electrical heaters are provided to control the evaporation rate of the hydrogen to match the fuel usage and to prevent icing during ascent and descent of the airplane.

11 Claims, 3 Drawing Sheets

LIGHT WEIGHT HYDROGEN TANK

TECHNICAL FIELD

The present invention relates to hydrogen powered vehicles, such as airplane, and more particularly to improved hydrogen fuel tanks for such vehicles.

BACKGROUND ART

Stratospheric vehicles, such as airplanes, have been proposed in recent years as platforms for communication repeaters which provide a variety of communication services. One type of vehicle which can be used for these platforms is a hydrogen powered airplane. The high density of hydrogen can achieve the long endurance at high altitudes needed for commercial communication systems. Compared to gasoline, hydrogen, when combined with atmospheric oxygen, yields about three times the energy density of gasoline. The time aloft duration of airplanes fueled by hydrogen can be measured in weeks.

However, the use of hydrogen has disadvantages which make it difficult to realize the endurance advantage. Hydrogen, even in liquid form, requires a relatively large volume storage tank. Also, the low liquid temperatures required for hydrogen fuel systems necessitate a fuel tank that is well insulated. Due to these properties of hydrogen, conventional designs result in heavy tanks with the weight offsetting most of the endurance improvements that the energy density of hydrogen might provide. These tanks typically include metal shells of sufficient thickness to withstand the internal pressures and to be stable against buckling, and a surrounding solid or powdered insulation layer of a thickness adequate to control the heat flow into the tank from the surrounding environment. For a required storage time of several weeks, such a design results in a very heavy tank on the order of 100% of the weight of the fuel.

Thus, a need exists for a light weight cryogenic fuel tank designed to store hydrogen fuel in an airplane for communication repeater platforms.

SUMMARY OF THE INVENTION

The above-stated need is satisfied by the present invention which includes a thin-walled spherical metal shell surrounded by a concentric metal and composite shell separated by a radial insulating gap. The inner shell carries the hydrogen mass and the gap between the shells is evacuated to a high vacuum. The outer shell preferably has a sandwich structure whose skins can be joined with a low conductive material. The mutually facing surfaces of the inner and outer shells are coated with a low emissivity metal, such as copper. The two shells are joined at two opposing equatorial locations. The vacuum gap and low emittance surface finishes on the two shells provide appropriate thermal insulation. External stiffening ribs could also be employed for shell stabilization where desired. An electrical heater conducts a controlled amount of heat to the outer shell. Radiation couples the heat to the inner shell and thus to the fuel in order to control the evaporation rate of the hydrogen. A second electrical heater is placed on the outer skin of the outer shell to prevent icing during ascent and descent.

Other benefits, features, and advantages of the present invention will become apparent from the following description of the invention when viewed in accordance with the accompanying drawings and appended claims.

BEST MODES FOR CARRYING OUT THE INVENTION

Figure 1:
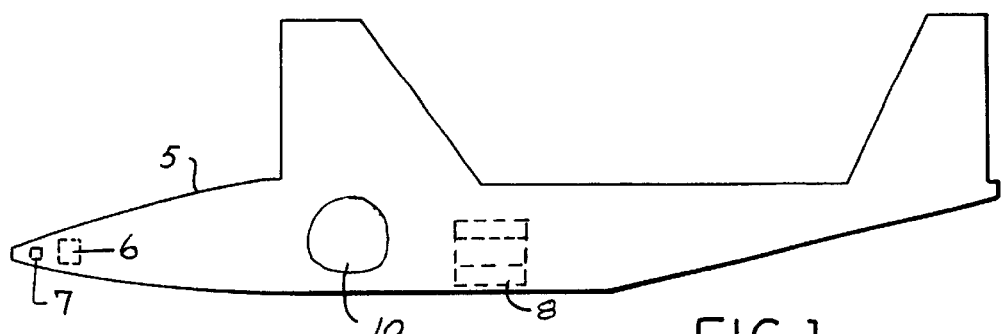
FIG. 1 illustrates a preferred use of the present invention.
Figure 2:
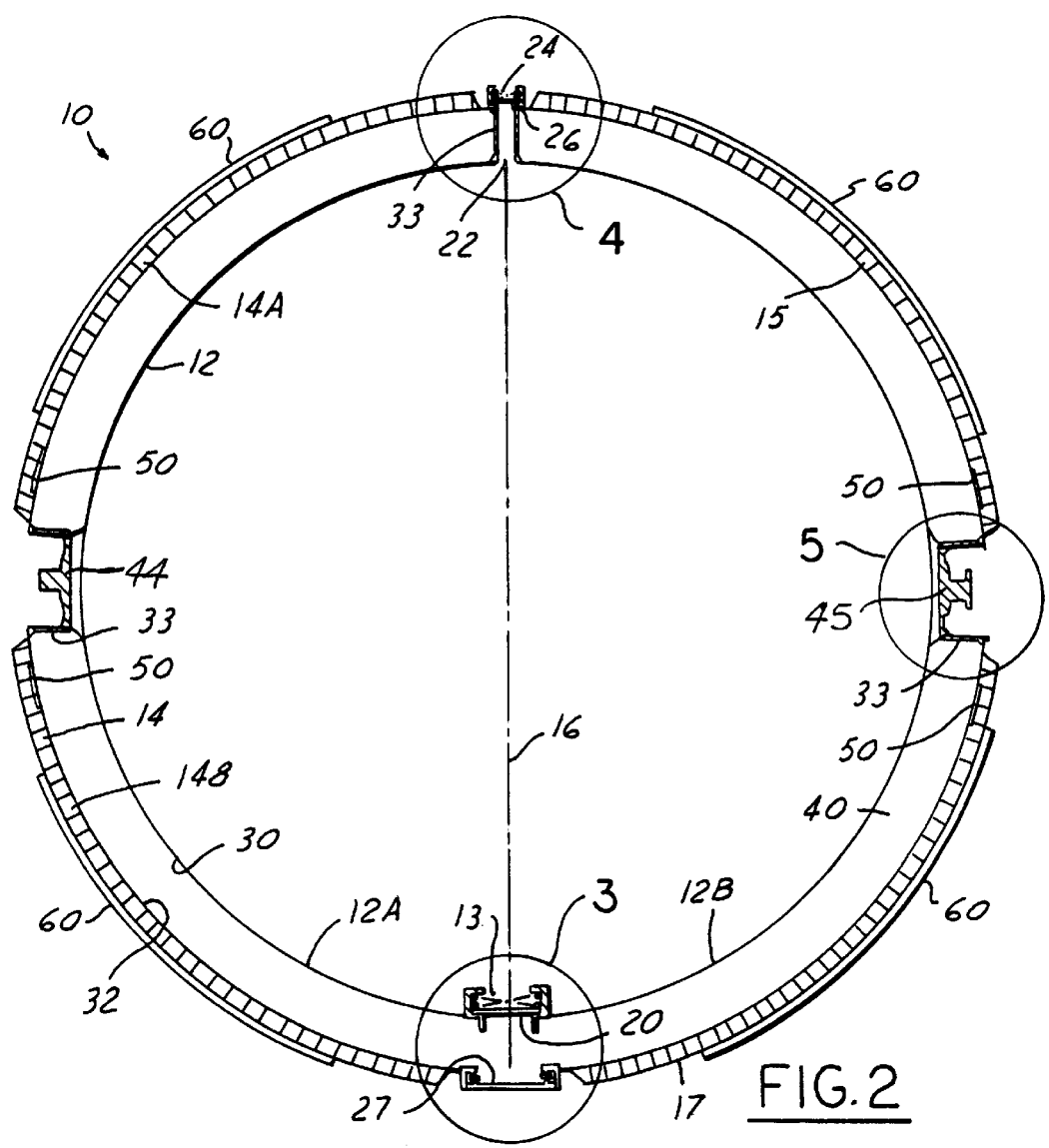
FIG. 2 illustrates a preferred embodiment of the present invention.

The present invention has particular use with stratospheric vehicles, such as hydrogen powered airplanes. A representative vehicle of this type is shown in FIG. 1 and designated by the reference numeral 5. The light weight hydrogen tank in accordance with the present invention is positioned in the airplane 5 and designated by the reference numeral 10. The airplane 5 also typically will include a fuel cell 6, turbocharger 7 and communication payload 8. The details of the hydrogen tank 10 are depicted in FIG. 2.

Figure 3:
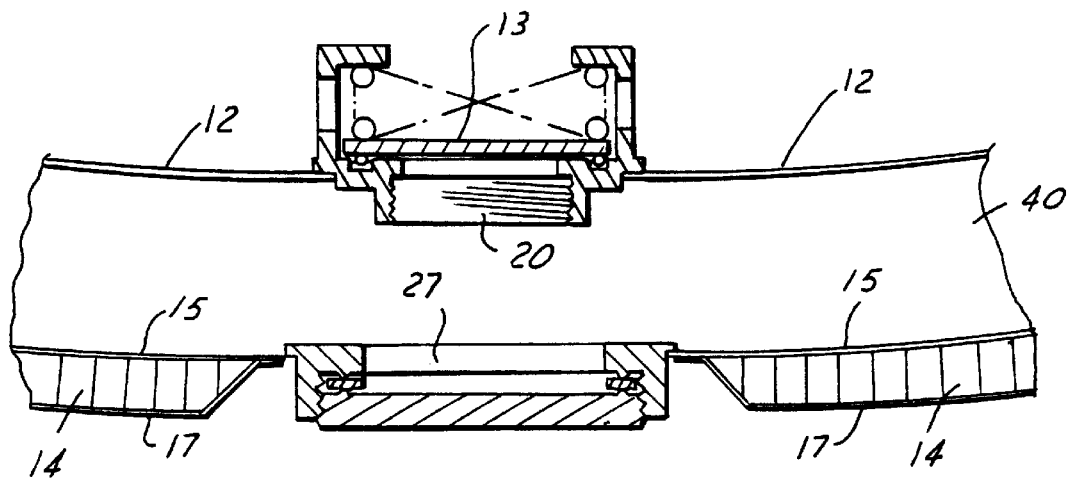
FIG. 3 is an enlarged view of a fill and drain site.
Figure 4:
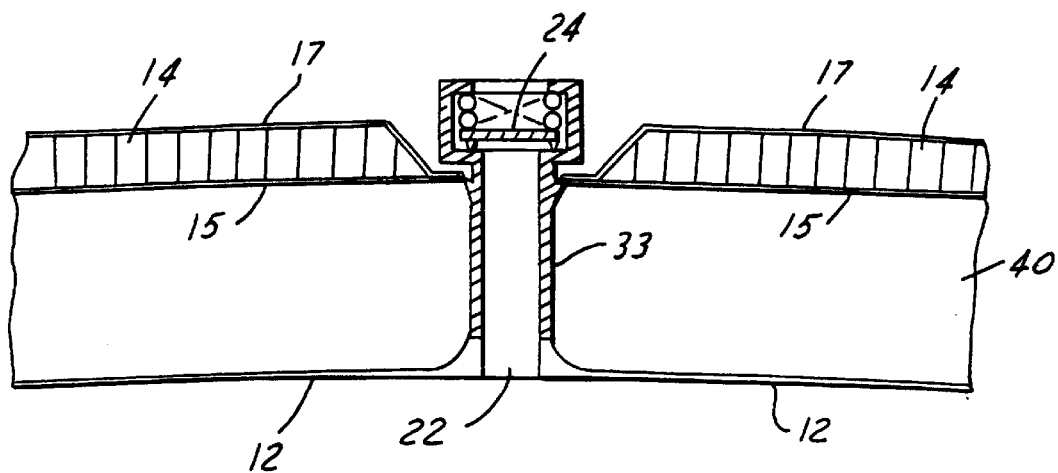
FIG. 4 is an enlarged view of a gas port site.

The tank 10 includes an inner spherical shell member 12 and an outer spherical shell member 14. The inner shell member is preferably made of a metal material in a spherical shape. In this regard, two semi-spherical halves 12A and 12B of the shell 12 are welded together along the seam or girth 16 in order to form the shell member 12. A port member or opening 20 is provided at one pole of the shell member 12 and contains a valve mechanism 13 for filling and draining of the hydrogen fuel (as shown in more detail in FIG. 3). A second port member opening 22 is provided at the opposite pole of the shell 12 and contains a valve mechanism 24 (as depicted in FIG. 4), which is used to dispense fuel for use in the vehicle 5.

The outer shell member 14 is also a spherical member made from two semi-spherical members 14A and 14B. The outer shell member preferably has a sandwich structure as shown. A honeycomb structure is one type of sandwich structure which can be utilized. A port member or opening 27, adjacent opening 20, is provided to gain access to the gap 40 between the shell members 12 and 14. The port 27 also allows access to the fill and drain port 20. The two semicircular members 14A and 14B are welded together around the circumference or girth 26.

The two shell members 12 and 14 are assembled together leaving the insulating gap 40 between them. For a hydrogen tank 10 on the order of eight feet in diameter, the gap 40 should be approximately 1–2 inches. The inner shell member 12 is preferably made of an aluminum or titanium material and preferably is about 0.015 inches (0.40 mm) in thickness. The outer shell member 14 is preferably constructed as a sandwich structure in order to reduce the overall weight and stabilize the tank structure under compressive pressure loads. The sandwich structure preferably has an inner skin 15 made of a strong, but lightweight, metal material, such as titanium, and which is approximately 0.20–0.25 mm in thickness. The outer skin 17 of the sandwich structure is preferably made of a strong, but lightweight composite material, such as Kevlar, and is approximately 0.15–0.20 mm in thickness. The overall thickness of the honeycomb member 14 is about 0.50–0.75 inches (about 20 mm) and the inner and outer skins preferably are joined together with a low thermal conduction insulating material, such as Nomex, or a low density foam.

Figure 5:
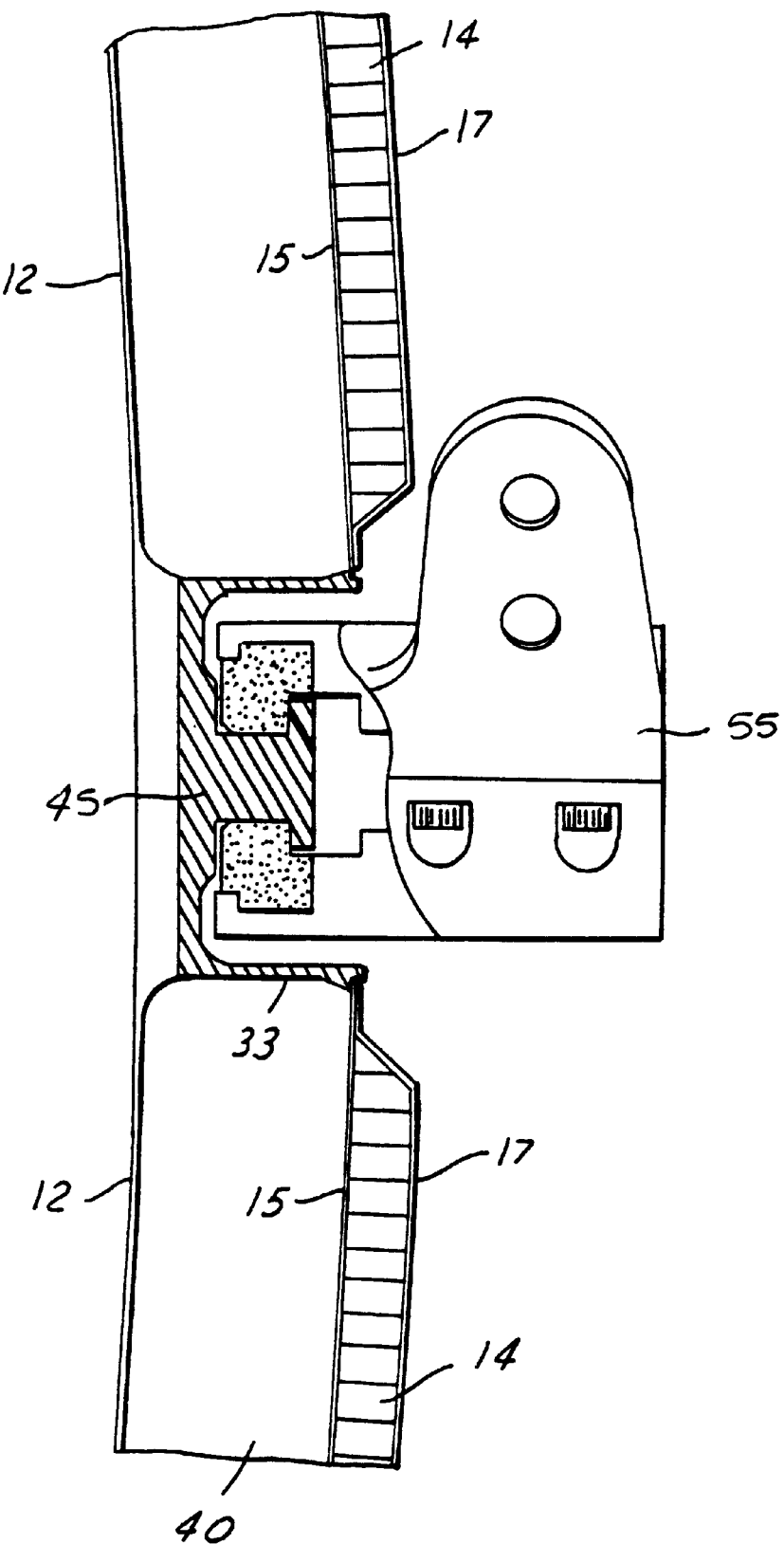
FIG. 5 is an enlarged view of an external support and connection site between the two shell members.

The two shell members 12 and 14 are connected together, preferably by welding, at two opposed equatorial positions, such as at structural supports 44 and 45. The two shell members 12 and 14 are also connected at the gas port 22. If the materials forming the two shell members are dissimilar, such as aluminum for the inner shell and titanium for the outer shell, then preferably an insert member is utilized at each the connection sites, such as insert member 33, shown in FIGS. 4 and 5. The insert member 33 is a bi-metal cylinder or the like which has an aluminum layer for attachment to the inner aluminum shell member 12 and a titanium layer for attachment to the outer shell member 14. The insert member 33 can be friction welded to the two shell members in order to form a secure, tight, and leak proof connection.

Additional structural contact can be provided between the two shell members 12 and 14 at a multiplicity of locations, if necessary, for shell alignment and/or assembly. However, these additional contacts should be minimal or minimized in order to avoid heat loss between the shells.

Support or mounting brackets 44 and 45 are positioned at two opposing locations around the circumference of the tank 10 between halves 14A and 14B of the outer shell member. An external support structure 55 is connected to the mounting bracket 45 and used to mount the tank 10 in the vehicle.

The outer surface 30 of the inner shell member 12 and the inner surface 32 of the outer shell member 14—i.e. the two mutually facing surfaces of the two shell members—are preferably polished and provided with shiny surfaces in order to aid in the insulative properties of the gap 40. In this regard, the two surfaces 30 and 32 can be coated with a flash of low emissivity metal, such as a copper or silver material. The coating can be 1000–8000 angstroms in thickness.

The gap 40 between the inner and outer shell members 12 and 14 is evacuated to a high vacuum, on the order of $10^{-8}$ atmosphere. Getters for out gassed material may be employed as necessary. The vacuum in the gap avoids heat convection and only low radiative heat transport between the two shell members exists.

An electrical heater 50 is provided around the circumference of the outer shell member 14 for control of heat flow to the hydrogen. The electrical heater 50, which preferably is a strip heater, conducts a controlled amount of heat to the outer shell, from which it is coupled by radiation to the inner shell and thus to the fuel. The heater 50 controls the evaporation rate of the hydrogen in the tank to match the fuel usage demand during operational period at altitude.

A second heater 60 is provided substantially around the outer surface of the outer shell 14. The heater 60, which preferably is a strip heater or a plurality of strip heaters, prevents icing of the tank during ascent and descent of the vehicle 5 through the humid lower atmosphere. The second heater 60 is not needed during the operational phase of the vehicle 5 when it is positioned at altitude in the relatively dry stratosphere.

The vacuum gap 40 and the low emittance surface finishes 30 and 32 on the facing sides between the shells 12 and 14 provide the primary thermal insulation of the tank 10. The insulation of the tank structure is increased by providing a low conduction core between the two layers or skins of the outer member, as indicated above.

The port 27 provides access to the radial gap 40 between the shells and also provides connection to a vacuum pump during ground servicing.

External stiffening ribs (not shown) could be employed for shell stabilization if needed, particularly during manufacture and assembly.

With the present invention, the hydrogen storage tank for long endurance stratospheric airplane purposes is provided, particularly for telecommunications. The present invention will store hydrogen for several weeks at a weight of approximately 15 percent of the fuel weight. This is in contrast to the approximately 100 percent of the fuel weight which might be expected of a conventional design.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A lightweight fuel tank comprising:

an outer spherical shell member;

an inner spherical shell member positioned inside said outer shell member;

said inner shell member and said outer shell member being positioned to provide an insulating radial gap between them;

said inner shell member having an outer surface and an inner surface, said outer surface being coated with a low emissivity material; and said outer shell member having an outer surface and an inner surface, said inner surface being coated with a low emissivity material;

said inner shell member being made of an aluminum material and said outer shell member being made of a sandwich of titanium, Kevlar and Nomex materials.

2. The light weight fuel tank as set forth in claim 1 further comprising a first heating mechanism on said outer shell member for controlling the rate of evaporation of hydrogen material contained in said inner shell member.

3. The light weight fuel tank as set forth in claim 2 comprising a second heating mechanism on said outer surface of said outer shell member for controlling icing of said fuel tank during use.

4. The light weight fuel tank as set forth in claim 1 wherein said low emissivity material is a flash of a copper material.

5. The light weight fuel tank as set forth in claim 1 further comprising a first port member in said outer shell member for evacuation of said radial gap to a vacuum, and provide access for filling said inner shell member with hydrogen material.

6. The light weight fuel tank as set forth in claim 5 further comprising a second port member in said inner shell member for filling said inner shell member with a hydrogen material, said second port member having a valve mechanism.

7. The light weight fuel tank as set forth in claim 1 further comprising a third port member in said inner shell member, said third port member having a valve mechanism.

8. The light weight fuel tank as set forth in claim 1 wherein said inner and outer shell members are connected at three locations, namely two opposing equatorial external support positions and a port member.

9. The light weight fuel tank as set forth in claim 8 wherein said inner and outer shell members of different materials are connected by a friction welded insert member.

10. A lightweight fuel tank comprising:

an outer spherical shell member;

an inner spherical shell member positioned inside said outer shell member;

said inner shell member and said outer shell member being positioned to provide an insulating radial gap between them;

said inner shell member having an outer surface and an inner surface, said outer surface being coated with a low emissivity material;

said outer shell member having a sandwich construction with an inner skin member made of a lightweight metal material, an outer skin member made of a lightweight composite material, and a core member made of a low thermal conduction insulating material; and wherein said inner skin member is an aluminum material, said outer skin member is a Kevlar material, and said core member is a low density foam material.

11. A lightweight fuel tank comprising:

an outer spherical shell member;

an inner spherical shell member positioned inside said outer shell member;

said inner shell member and said outer shell member being positioned to provide an insulating radial gap between them;

said inner shell member having an outer surface and an inner surface, said outer surface being coated with a low emissivity material;

said outer shell member having a sandwich construction with an inner skin member made of a lightweight metal material, an outer skin member made of a lightweight composite material, and a core member made of a low thermal conduction insulating material; and wherein said inner shell member is made of an aluminum material and said outer shell member is made of a sandwich of titanium, Kevlar and Nomex materials.

* * * * *